United States Patent
Ludwig

(10) Patent No.: US 9,160,707 B2
(45) Date of Patent: Oct. 13, 2015

(54) DIFFERENTIATED HANDLING OF NETWORK TRAFFIC USING NETWORK ADDRESS TRANSLATION

(75) Inventor: Reiner Ludwig, Hurtgenwald (DE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 144 days.

(21) Appl. No.: 13/818,033

(22) PCT Filed: Oct. 22, 2010

(86) PCT No.: PCT/EP2010/065987
§ 371 (c)(1),
(2), (4) Date: Feb. 20, 2013

(87) PCT Pub. No.: WO2012/052065
PCT Pub. Date: Apr. 26, 2012

(65) Prior Publication Data
US 2013/0148665 A1    Jun. 13, 2013

(51) Int. Cl.
*H04L 29/06* (2006.01)
*H04L 29/12* (2006.01)
*H04L 12/14* (2006.01)
*H04L 12/26* (2006.01)
*H04L 12/851* (2013.01)
*H04L 12/801* (2013.01)

(52) U.S. Cl.
CPC ........ *H04L 61/2575* (2013.01); *H04L 12/1485* (2013.01); *H04L 29/12367* (2013.01); *H04L 43/026* (2013.01); *H04L 47/24* (2013.01); *H04L 61/2514* (2013.01); *H04L 61/2557* (2013.01); *H04L 47/14* (2013.01); *H04L 61/1511* (2013.01)

(58) Field of Classification Search
None
See application file for complete search history.

(56) References Cited

U.S. PATENT DOCUMENTS 6,128,298 A     10/2000   Wootton et al.
6,608,832 B2 *  8/2003    Forslow ........................ 370/353
(Continued)

FOREIGN PATENT DOCUMENTS

EP        2 109 266 A1      10/2009
WO     WO 9922566 A2 *      5/1999   ............. H04Q 11/04
WO     WO 2013117221 A1 *   8/2013

OTHER PUBLICATIONS

3GPP. 3GPP Generation Partnership Project; Technical Specification Group System Aspects; General Packet Radio Service (GPRS): Service Description: Stage 2 (release 10). 3GPP TS 23.060 V10.1.0. Sep. 29, 2010.

(Continued)

*Primary Examiner* — Ayaz Sheikh
*Assistant Examiner* — Tarell Hampton

(57) ABSTRACT

In order to allow efficient differentiated handling of network traffic in a network section, a network address translator performs network address translation on incoming data packets to be transmitted into the network section and/or on outgoing data packets transmitted from the network section. In the incoming data packets, the network address translation replaces a source network address with a replacement network address. In the outgoing data packets, a replacement network address is included in place of a destination address, and the network address translation replaces the replacement network address with the destination network address. In each case, the replacement network address is selected according to a traffic class of the data packet. In the network section, differentiated handling of the data packets on the basis of the replacement network address is provided.

21 Claims, 8 Drawing Sheets

(56) References Cited

U.S. PATENT DOCUMENTS

| | | |
|---|---|---|
| 6,658,002 B1 | 12/2003 | Ross et al. |
| 6,754,662 B1 | 6/2004 | Li |
| 6,788,701 B1 * | 9/2004 | Mahalingaiah et al. ...... 370/429 |
| 6,965,599 B1 * | 11/2005 | Sakurai et al. ................ 370/392 |
| 6,985,440 B1 | 1/2006 | Albert et al. |
| 7,215,637 B1 | 5/2007 | Ferguson et al. |
| 7,292,531 B1 | 11/2007 | Hill |
| 7,392,379 B2 | 6/2008 | Le Pennec et al. |
| 7,457,300 B2 * | 11/2008 | Christensen et al. ......... 370/401 |
| 7,483,632 B2 * | 1/2009 | Sung et al. ....................... 398/63 |
| 7,525,969 B2 | 4/2009 | Grant |
| 7,562,393 B2 | 7/2009 | Buddhikot et al. |
| 7,680,478 B2 | 3/2010 | Willars et al. |
| 7,742,406 B1 | 6/2010 | Muppala |
| 7,970,899 B2 | 6/2011 | Wiryaman et al. |
| 8,233,488 B2 | 7/2012 | Livescu et al. |
| 8,571,016 B2 * | 10/2013 | Urzi et al. ..................... 370/352 |
| 2002/0010799 A1 | 1/2002 | Kubota et al. |
| 2002/0112076 A1 | 8/2002 | Rueda et al. |
| 2002/0141390 A1 | 10/2002 | Fangman et al. |
| 2002/0143955 A1 * | 10/2002 | Shimada et al. .............. 709/227 |
| 2002/0145981 A1 | 10/2002 | Klinker et al. |
| 2002/0150083 A1 | 10/2002 | Fangman et al. |
| 2004/0240447 A1 | 12/2004 | Dorbolo et al. |
| 2004/0246991 A1 | 12/2004 | Tsuzuki et al. |
| 2005/0100032 A1 | 5/2005 | Patiejunas |
| 2005/0243789 A1 | 11/2005 | Dinello et al. |
| 2006/0002386 A1 | 1/2006 | Yik et al. |
| 2006/0193320 A1 * | 8/2006 | Shin et al. ..................... 370/389 |
| 2006/0203721 A1 | 9/2006 | Hsieh et al. |
| 2007/0201490 A1 * | 8/2007 | Mahamuni .............. 370/395.54 |
| 2008/0008159 A1 | 1/2008 | Bourlas et al. |
| 2008/0049752 A1 * | 2/2008 | Grant ............................ 370/392 |
| 2008/0062978 A1 | 3/2008 | Hwang et al. |
| 2008/0175251 A1 * | 7/2008 | Oouchi et al. ........... 370/395.31 |
| 2009/0073987 A1 * | 3/2009 | Li et al. .................... 370/395.31 |
| 2009/0323703 A1 | 12/2009 | Bragagnini et al. |
| 2010/0008292 A1 * | 1/2010 | Ludwig et al. ................ 370/328 |
| 2010/0031323 A1 | 2/2010 | Wiryaman et al. |
| 2010/0088741 A1 | 4/2010 | Wiryaman et al. |
| 2010/0088742 A1 | 4/2010 | Wiryaman et al. |
| 2010/0111091 A1 | 5/2010 | Adams et al. |
| 2010/0135292 A1 | 6/2010 | Woo et al. |
| 2011/0268096 A1 | 11/2011 | Lauer |
| 2011/0268119 A1 | 11/2011 | Pong et al. |
| 2012/0078994 A1 | 3/2012 | Jackowski et al. |
| 2012/0099592 A1 * | 4/2012 | Ludwig ........................ 370/392 |
| 2014/0301191 A1 * | 10/2014 | Ludwig et al. ................ 370/230 |

OTHER PUBLICATIONS

3GPP. 3GPP Generation Partnership Project Technical Specification Group Core Network and Terminals; Non-Access-Stratum (NAS) Protocol for Evolved Packet Systems (EPS); Stage 3 (release 10). 3GPP TS 24.301 V10.0.0. Sep. 28, 2010.

Rekhter, Y. et al. Address Allocation for Private Internets. Network Working Group. RFC 1916. Feb. 1996.

Hinden, R. et al. Unique Local IPv6 Unicast Addresses. Network Working Group. RFC 4193. Oct. 2005.

Cotton, M. et al. Special Use IPv4 Addresses. Internet Engineering Task Force. RFC 5735. Jan. 2010.

Bilgic, M. et al. Quality of Service in General Packet Radio Service. Mobile Multimedia Communications, Nov. 15, 1999.

United States Office Action, dated Jan. 14, 2013, issued in related U.S. Appl. No. 13/039,386.

International Preliminary Report on Patentability dated Dec. 14, 2012, issued in related International Application No. PCT/EP2010/065987.

* cited by examiner

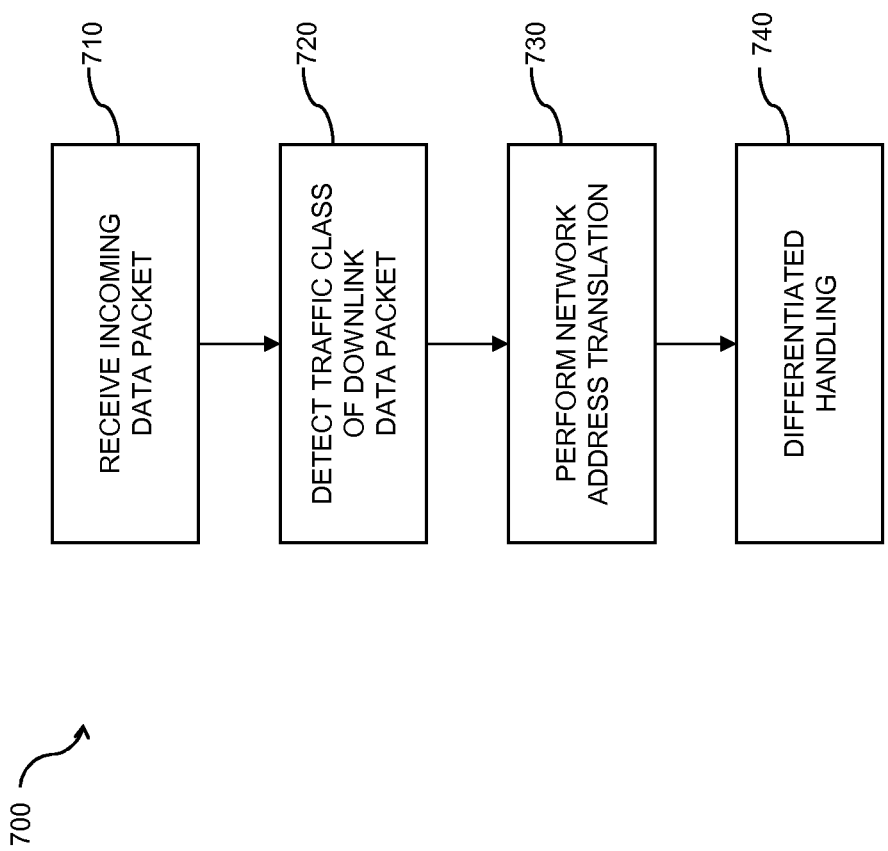

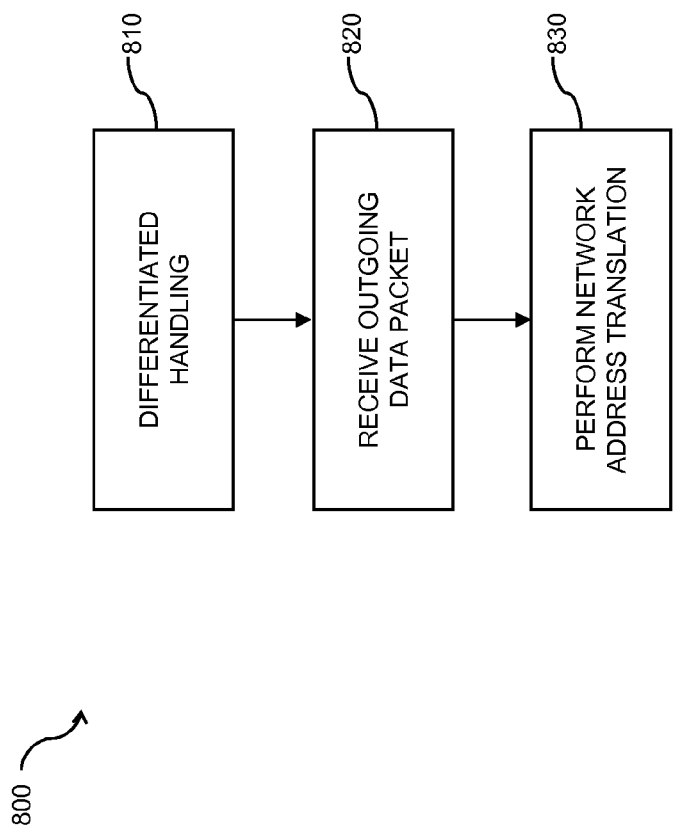

DIFFERENTIATED HANDLING OF NETWORK TRAFFIC USING NETWORK ADDRESS TRANSLATION

CLAIM OF PRIORITY

This application is a 371 of PCT/EP2010/065987 filed Oct. 22, 2010, the disclosure of which is fully incorporated herein by reference.

TECHNICAL FIELD

The present invention relates to methods for differentiated handling of network traffic and to corresponding network devices.

BACKGROUND

In communication networks, differentiated handling of network traffic may be used to distinguish between different classes of network traffic. For example, a forwarding treatment of data packets, i.e., the way of forwarding a data packet on the way towards its destination, may be controlled to provide a certain Quality of Service (QoS) level, which depends on the traffic class. In other examples, the handling of the network traffic may also be differentiated with respect to charging, i.e., one traffic class could be charged in a different manner than another. Typically, traffic classification rules, e.g. packet classification rules, are defined so as to implement the differentiation between different types of network traffic.

For example, in mobile communication networks network traffic related to a specific service may be directed to a bearer offering a certain QoS level. In this respect, a bearer is considered to be an information transmission context or path of defined characteristics, e.g. capacity, delay and/or bit error rate. Typically, a number of bearers will be established between a gateway of a mobile communication network and a user equipment (UE), e.g. a mobile phone or other type of mobile terminal. A bearer may carry downlink (DL) data traffic in a direction from the network to the user equipment, and may carry data traffic in an uplink (UL) direction from the user equipment to the network. In the gateway and in the user equipment the data traffic, which includes a plurality of IP data packets (IP: "Internet Protocol", which may be the IP Version 4, also referred to as IPv4, or the IP Version 6, also referred to as IPv6) can be filtered, e.g. using IP 5-tuple packet filters, thereby directing the IP data packets to a desired bearer. According to the 3GPP (Third Generation Partnership Project) Technical Specifications (TSs) 23.060 and 24.301, a set of packet filters used to direct the data traffic to a certain bearer is also referred to as a Traffic Flow Template (TFT). In this context, the TFT can be considered as an example of a packet classification rule. Differentiated handling of network traffic may also be useful in other types of communication network environment, e.g. using fixed access technology such as DSL (Digital Subscriber Line), fibre optical access or coaxial cable access.

However, in some scenarios rather complex traffic classification rules need to be defined in order to achieve the desired differentiation. This may specifically be problematic when considering that in some communication network environments there exist limits on the complexity of the traffic classification rules. For example, the 3GPP TSs limit the maximum number of packet filters which can be installed in a TFT of the UE.

Accordingly, there is a need for techniques which allow for efficiently differentiating between different traffic classes.

SUMMARY

According to an embodiment of the invention, a method of processing network traffic is provided. According to the method, an incoming data packet to be transmitted into a network section is received. The incoming data packet includes a source network address. The received data packet is then subjected to network address translation by replacing the source network address with a replacement network address. The replacement network address is selected according to a traffic class of the data packet. In the network section, differentiated handling of the data packet on the basis of the replacement network address is provided.

According to a further embodiment of the invention, a method of processing network traffic is provided. According to the method, an outgoing data packet transmitted from a network section is received. The outgoing data packet includes a replacement network address in place of a destination network address of the data packet. The replacement network address is selected according to a traffic class of the data packet. The received data packet is subjected to network address translation by replacing the replacement network address with the destination network address. In the network section, differentiated handling of the data packet on the basis of the replacement network address is provided.

According to a further embodiment of the invention, a network device is provided. The network device is provided with an interface configured to receive an incoming data packet to be transmitted into a network section. The incoming data packet includes a source network address. Further, the network device includes a network address translator configured to perform network address translation on the received data packet. The process of network address translation includes replacing the source network address with a replacement network address. The replacement network address is selected according to a traffic class of the data packet. In the network section, differentiated handling of the data packet on the basis of the replacement network address is provided.

According to a further embodiment of the invention, a network device is provided. The network device is provided with an interface configured to receive an outgoing data packet transmitted from a network section. The outgoing data packet includes a replacement network address in place of a destination network address of the data packet. The replacement network address is selected according to a traffic class of the data packet. Further, the network device includes a network address translator configured to perform network address translation on the received data packet. The process of network address translation includes replacing the replacement network address with the destination network address of the data packet. In the network section, differentiated handling of the data packet on the basis of the replacement network address is provided.

According to further embodiments, other methods, devices, or computer program products for implementing the methods may be provided.

BRIEF DESCRIPTION OF THE DRAWINGS

FIG. 7 shows a flowchart for illustrating a method according to an embodiment of the invention.

FIG. 8 shows a flowchart for illustrating a further method according to an embodiment of the invention.

DETAILED DESCRIPTION OF EMBODIMENTS

Figure 1:
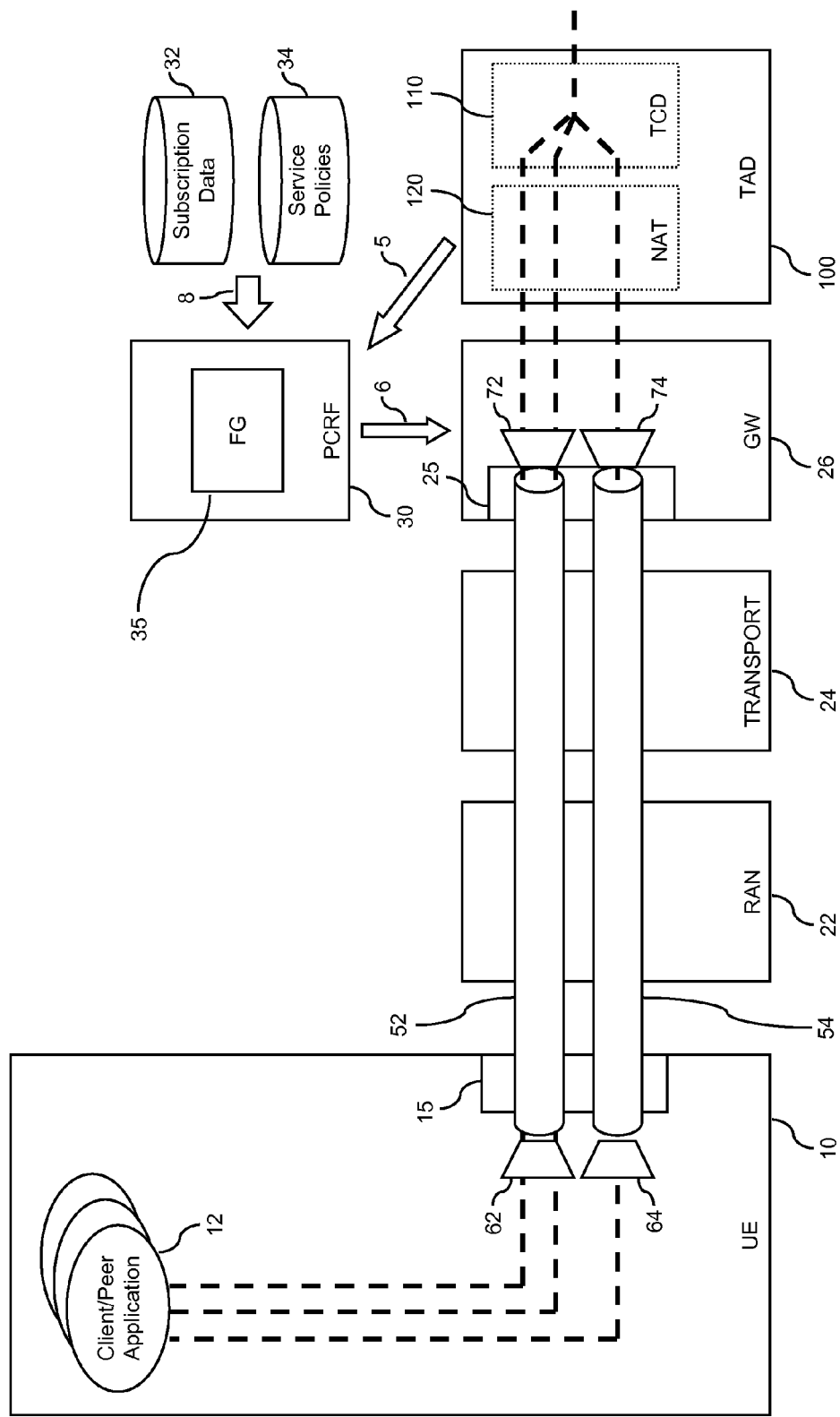
FIG. 1 schematically illustrates a communication system in which concepts according to embodiments of the invention are implemented.

In the following, the invention will be explained in more detail by referring to exemplary embodiments and to the accompanying drawings. The illustrated embodiments relate to concepts for differentiated handling of network traffic. As illustrated in FIG. 1, the concepts are applied in a mobile communication network according to the 3GPP TSs. However, it is to be understood that the illustrated concepts may be applied in other types of communication network as well, e.g. using fixed access technology such as DSL, fiber optical access, or coaxial cable access.

FIG. 1 schematically illustrates a communication network environment in which concepts according to embodiments of the invention the invention can be applied.

The communication network environment includes a UE 10, which may also be referred to as a terminal, and a number of network components 22, 24, 26, 30. Among these network components there is a Radio Access Network (RAN) 22. The RAN 22 is based on a certain type or certain types of radio access technology, e.g. GSM (Global System for Mobile Communications), EDGE (Enhanced Data Rate for GSM Evolution), UMTS (Universal Mobile Telecommunications System) or LTE (Long Term Evolution). Although the RAN 22 is illustrated as a single node, it is to be understood that the RAN 22 may actually be formed of a number of components, which are not further explained herein. The RAN 22 is coupled to a transport node 24, which in turn is coupled to a gateway (GW) 26. Here, it is to be understood that alternatively more than one transport node 24 may be coupled between the RAN 22 and the gateway 26 or that the RAN 22 may be directly coupled to the gateway 26. The gateway 26 may be a Gateway GPRS Support Node (GGSN) providing a connection of GPRS-based services to one or more external packet data networks. The gateway 26 may also be a System Architecture Evolution Gateway (SAE GW) according to the 3GPP TSs.

In addition, the mobile communication network includes a policy controller 30, which is implemented as a Policy and Charging Rules Function (PCRF) according to the 3GPP TSs. The policy controller 30 may be implemented by dedicated hardware and/or comprise software functions executed by a processor. The gateway 26 and the policy controller 30 are typically regarded as components of a core network. The policy controller 30 communicates with the gateway 26 via a signaling path 6, which may be implemented using the Gx interface according to the 3GPP TSs. The policy controller 30 may be further coupled to a subscription database 32 and to a service policy database 34 via a signaling path 8, e.g. implemented using a Sp interface according to the 3GPP TSs. The policy controller 30 may thus receive policy data relating to a specific user and/or relating to a specific service available in the mobile communication network, e.g. mobile TV. The policy controller 30 may further communicate with other network functions using a control signaling path 5, which may be implemented using the Rx interface according to the 3GPP TSs.

Among other functions, the policy controller 30 may comprise a filter generator 35. The filter generator 35 is adapted to specify packet filters to be used in the UE 10 and the gateway 26, which may be accomplished on the basis of subscription data from the subscription database 32, service policies from the service policy database 34, and control data received via the signaling path 5. The packet filters are an example of packet classification rules, which in the illustrated example are used to provide different QoS service levels depending on the traffic class. In other examples, packet filters or other packet classification rules could be used to differentiate between different ways of charging, to selectively block certain traffic classes, which may also be referred to as gating, or to selectively redirect certain traffic classes.

As further illustrated, data traffic between the network and the user equipment 10 is carried by a number of bearers 52, 54. The data traffic typically pertains to one or more client/peer applications 12 running on the UE 10. The bearers 52, 54 are established between the user equipment 10 and the gateway 26. The bearers 52, 54 carry data traffic in both the DL and the UL direction, i.e. may also be regarded as being formed of a DL bearer and a UL bearer. For supporting bidirectional communication on the bearers 52, 54, the UE 10 is provided with a corresponding interface 15 which allows for receiving incoming data packets from the bearers 52, 54 and sending outgoing data packets on the bearers 52, 54. Similarly, the gateway 26 is provided is provided with a corresponding interface 25 which allows for receiving incoming data packets from the bearers 52, 54 and sending outgoing data packets on the bearers 52, 54. The bearers 52, 54 may include a default bearer 52 generally established for offering packet-based services to the user equipment 10 and one or more dedicated bearer 54 which may have different QoS level, e.g. a higher or lower QoS level, than the default bearer. The default bearer 52 is typically established when the UE 10 attaches to the gateway 26. The dedicated bearer is typically established on demand, e.g. when data packets requiring a certain QoS level need to transmitted. However, in some embodiments dedicated bearers may also established in advance, e.g., when the UE 10 attaches to the gateway 26. Each bearer 52, 54 may be associated with a corresponding QoS profile. The QoS profile may be defined through parameters such as a QoS Class Identifier (QCI), an Allocation/Retention Priority (ARP), a Traffic Handling Priority (THP), a Maximum Bit Rate (MBR), an Aggregate Maximum Bit Rate (AMBR), and/or a Guaranteed Bit Rate (GBR). Accordingly, a certain QoS level may be provided for communicating data packets between the UE 10 and the gateway 26 by assigning the data packets to a corresponding one of the bearers 52, 54.

In the UE 10, the data packets are routed to a desired bearer 52, 54 using correspondingly configured packet classification rules in the form of UL packet filters 62, 64. In the gateway 26, the data packets are routed to the desired bearers 52, 54 using correspondingly configured packet classification rules in the form of DL packet filters 72, 74. In accordance with the illustrated 3GPP scenario, a set of filters 62, 64, 72, 74 which operates to direct the data packets to a corresponding bearer may also be referred to as a TFT. Parameters of the QoS profile may be signaled from the policy controller 30 to the gateway 26 using the signaling path 6. Similarly, the DL packet filters 72, 74 to be used in the gateway 26 may be signaled from the policy controller 30 to the gateway 26 via the signaling path 6. As regards the UL packet filters 62, 64 used in the UE 10, these may be signaled from the policy controller 30 via the gateway 26.

In the following, concepts according to embodiments of the invention will be explained, which allow for efficiently differentiating between different traffic classes. In the example of FIG. 1, these concepts are applied with respect to the differentiation between traffic classes in the UE 10 and in the gateway 26, where the data packets are directed to the bearers 52, 54 using the packet filters 62, 64, 72, 74. These packet filters 62, 64, 72, 74 are generally configured to operate on the basis of network addresses, which are included in a respective protocol header of the data packets. For example, when using the Transport Control Protocol (TCP) or the User Datagram Protocol (UDP) for implementing transport of data via the data packets, the protocol header will include IP addresses defining a source network address and a destination network address of the data packet, which can be used separately or in combination as a basis for matching a filter pattern defined in the packet filter 62, 64, 72, 74. Moreover, the above examples of a protocol header will also define a source port number and a destination port number, which can be used separately or in combination as a basis for matching a filter pattern defined in the packet filter 62, 64, 72, 74. In some embodiments, the packet filters 62, 64, 72, 74 may operate on the basis of a pattern for matching an IP 5 tuple (source IP address, destination IP address, source port number, destination port number, protocol ID of the protocol above IP) of the data packets. Further, the packet filters may operate on a filter pattern in which an IP address is be combined with a prefix mask, and/or port numbers are be specified as port ranges. The filter pattern can also be extended by the Type of Service (TOS) (IPv4)/Traffic class (IPv6) and Mask. The filter pattern can also consist of the destination IP address, protocol ID of the protocol above IP, the Type of Service (TOS) (IP Version 4)/Traffic class (IP Version 6) and Mask and the IPSec Security Parameter Index (SPI). The filter pattern can also consist of the destination IP address, the Type of Service (TOS) (IPv4)/Traffic class (IPv6) and Mask and the Flow Label (IPv6). In some embodiments, a value left unspecified in the filter pattern packet filter 62, 64, 72, 74 may match any value of the corresponding information in the data packet, i.e., wildcards may be defined.

Typically, the information in the protocol headers of data packets, in particular with respect the source and destination addresses, will vary considerably due to the fact that the data packets may be communicated with any host, and the network address used by this host may be any network address from the available public address space. Irrespective of significant differences in the information of the protocol headers, data packets may still belong to the same traffic class, e.g., a traffic class for which in the example of FIG. 1 the data packets should be directed to the same bearer 52, 54.

In order to reduce complexity of the packet filters 62, 64, 72, 74, concepts according to embodiments of the invention as explained in the following are based on an adaptation of the data traffic upon entering or leaving a network section in which differentiated handling of the data traffic is provided. In this way, the data traffic can be brought into a form which facilitates the differentiated handling. More specifically, incoming data packets to be transmitted into the network section are subjected to network address translation in which source network addresses are replaced with replacement network addresses. Further, outgoing data packets leaving the network section are subjected to network address translation in which replacement network addresses are replaced with corresponding destination network addresses of the data packets. The replaced source or destination addresses are typically suitable for routing the data packets outside the network section and will in the following also be referred to as external network addresses. In some embodiments the external network addresses may be public network addresses from a total address space, e.g., include public IP version 4 (IPv4) addresses or public IP version 6 (Ipv6) addresses. As compared to that, the replacement network addresses, which are typically from the same total address space, do not need to be suitable for routing the data packets outside the network section, but merely locally within the network section. The replacement network addresses may therefore also be referred to as internal or local network addresses. In some embodiments the replacement network addresses may be private network addresses from the total address space, e.g., as defined in RFC 1918, RFC 4193, or RFC 5735. The replacement network addresses could also be selected from a reserved special purpose address range of the total address range.

In the illustrated embodiments, the network address translation will be based on a mapping of external addresses to corresponding replacement network addresses. The mapping between external network addresses and replacement network addresses may be dynamically generated, e.g., in response to detecting data traffic of a certain class. In some embodiments, the mapping may also be preconfigured, e.g. by a network operator. In embodiments which are applicable to both data packets entering the network section and to data packets leaving the network section, the network address translation is based on the same mapping of the external network address to a corresponding replacement network address.

In the network section, differentiated handling of the data packets is performed on the basis of the replacement network addresses. In each case, the network address translation is based on a mapping of the external network address to a corresponding replacement network address. This mapping may be based on stored replacement mapping data, which may be dynamically generated, e.g., in response to detection data traffic of a certain class. In some embodiments, the replacement mapping data may also be preconfigured, e.g., by a network operator.

In order to implement the above concepts, the communication system of FIG. 1 further includes a traffic adaptation device (TAD) 100. The traffic adaptation device 100 is arranged at an interface to the network section in which differentiated handling is performed, in the illustrated embodiment at the interface to a network section including the UE 10, the RAN 22, the transport node 24, and the gateway 26. As illustrated, the traffic adaptation device 100 is coupled to receive UL traffic coming from the gateway 26 and to receive DL traffic going to the gateway 26. According to an embodiment of the invention, the traffic adaptation device 100 may be part of the gateway 26. However, the traffic adaptation device 100 could also be implemented within other network devices or as a standalone network device.

As illustrated, the traffic adaptation device 100 is provided with a traffic class detector (TCD) 110 and a network address translator (NAT) 120. The traffic class detector 110 and the network address translator 120 may be implemented by software by having a processor (not illustrated in FIG. 1) of the traffic adaptation device 100 execute suitably configured program code. As an alternative, the traffic class detector 110 and/or the network address translator 120 could also at least in part be implemented by dedicated hardware.

The traffic class detector 110 is operable to determine a traffic class of data packets in the UL or DL traffic. For this purpose, the traffic class detector 110 may analyze data packets of the UL or DL traffic, e.g., with respect to information in the protocol header of the data packets, such as source and/or destination network addresses or port numbers. In some embodiments, the traffic class detector 110 may also analyze certain messages which are typically transmitted when setting up or preparing the transmission of the data packets, e.g., Domain Name System (DNS) messages, in particular DNS queries or responses to DNS queries, or messages of a signaling protocol, e.g., messages of the Session Initiation Protocol (SIP), or the like. These messages may also be referred to as setup messages. As can be seen from the above-mentioned examples, a setup message may initiate the transfer of content by the data packets, e.g., if the setup message is a SIP request. A setup message may also request protocol information to be used for transmitting the data packets, such as source or destination network addresses to be included into the protocol headers of the data packets, e.g., if the setup message is a DNS query. A setup message may also convey such protocol information, e.g., if the setup message is a response to a DNS query. By monitoring the setup messages, a traffic class of the data packets associated with the monitored message, e.g., transmitted subsequently or in response to the monitored message, may be determined without looking at or into the data packets themselves. Rather, such a determination can already be made before the data packets are transmitted or received. Exemplary mechanisms of detecting the traffic class will be discussed below.

The network address translator 120 is operable to subject data packets incoming data packets, i.e., in the illustrated example the DL data packets to be transmitted from the gateway 26 to the UE 10, to network address translation by replacing the external source network addresses of the data packets with the corresponding replacement network addresses. In some embodiments, the external destination network addresses of the data packets are maintained by the network address translation. Accordingly, the network address translation can be accomplished without modifying the destination network address. In this way, the UE 10 can be addressed using its external network address, while the replacement network addresses can be used by the DL packet filters 72, 74 for efficiently directing the DL data packets to the desired bearer 52, 54, without otherwise affecting the routing of the DL data packets from the network address translator 120 to the UE 10. In some embodiments, the network address translation could also replace the destination network addresses of the DL data packets, i.e., the external network address used by the UE 10, with a corresponding replacement network address. In this case, the routing of the DL data packets from the network address translator 120 to the UE 10 could be based on the replacement network address corresponding to the external network address of the UE 10.

Further, the network address translator 120 is operable to subject outgoing data packets, i.e., in the illustrated example the UL data packets which have been transmitted from the UE 10 to the gateway 26, to network address translation by replacing a replacement network address, which replaces the destination network address of the UL data packets, with the corresponding external network address. In some embodiments, the source addresses of the UL data packets may be external network addresses and be maintained by the network address translation. Accordingly, the network address translation can be accomplished without modifying the source network address. In this way, the UE 10 can identify itself as sender of the UL data packets by using its external network address, while the replacement network addresses can be used by the UL packet filters 62, 64 for efficiently directing the UL data packets to the desired bearer 52, 54. In some embodiments, the network address translation could also replace the source network address of the UL data packets, in FIG. 1 the external network address used by the UE 10, with a corresponding replacement network address. The operation of the network address translator 120 concerning the outgoing data packets is substantially inverse with respect to the operation of the network address translator 120 concerning the incoming data packets, which is obtained by using the same mapping between external network addresses and replacement network addresses.

By using the replacement network addresses as the basis for differentiated handling, the differentiation between different traffic classes can be facilitated in a significant manner. In one scenario, already the use of the replacement network address could indicate that the data packet belongs to a certain traffic class. For example, the network address translator could be configured to replace the external network addresses of those data packets which belong to a certain traffic class, e.g., "premium" or "trash", by corresponding replacement network addresses, while leaving the other data packets unchanged. The packet filters could then operate to simply identify those data packets carrying replacement network addresses in the place of the source or destination network address and direct the identified data packets to the desired bearer. For example, if the replacement network addresses are selected from a specific address range of the total available address range, e.g., from a subnet or from a range of neighboring addresses, distinguishing between replacement network addresses and external network addresses can be implemented in a very efficient manner using wildcards or ranges in the filter pattern for matching the network addresses. In a further scenario, the selection of replacement addresses from a corresponding replacement address range could be used to differentiate between multiple different traffic classes. For example, different traffic classes could be assigned to corresponding subnets or of the replacement address range. In this way, distinguishing between different replacement network address ranges assigned to different traffic classes can be implemented in a very efficient manner using wildcards in the filter pattern for matching the network addresses. In some embodiments, when assuming a given assignment of one or more traffic classes to corresponding replacement address ranges, the packet filters could even be preconfigured in the UE 10 or in the gateway 26, thereby avoiding the need for dynamic generation or signaling of the packet filters.

Figure 2:
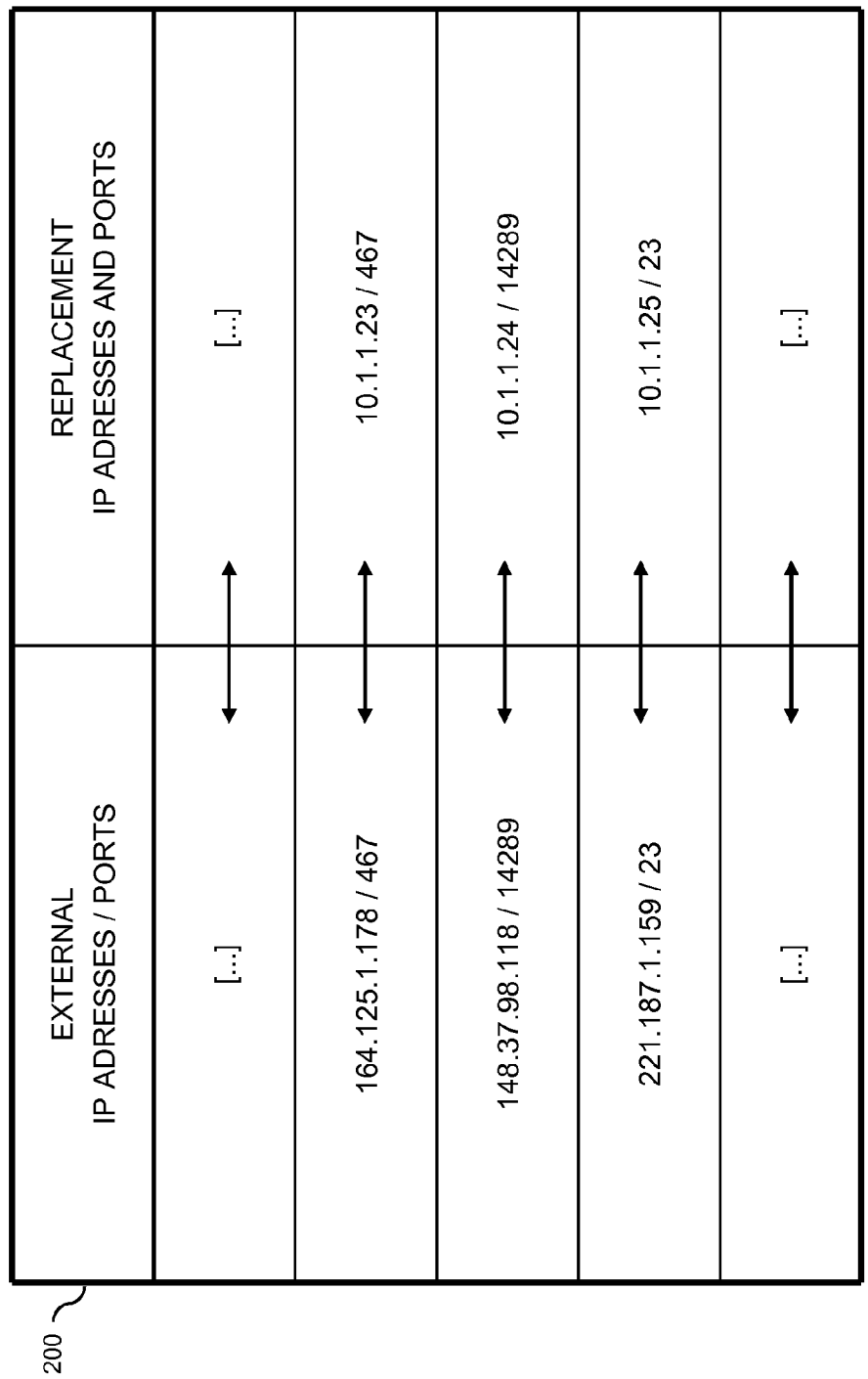
FIG. 2 schematically illustrates an example of a table for mapping network addresses to replacement network addresses.

FIG. 2 schematically illustrates an exemplary replacement table 200 used for defining a mapping between external network addresses and replacement network addresses. As illustrated, both the external network addresses and the replacement network addresses include network addresses from the IPv4 address space an further include port numbers. The external network addresses are public addresses, whereas the replacement network addresses are from a private subnet of the total address space. A one-to-one mapping is defined between the external network addresses and the replacement network addresses. Accordingly, the network address translation on incoming data packets will always replace an external source address with the corresponding replacement network address, and the network address translation on the outgoing data packets can retranslate this replacement network address to the original external network address, thereby providing compatibility to protocols using bidirectional exchange of data packets, e.g., when sending acknowledgement data packets in response to successfully receiving a data packet such as in TCP. In the example of FIG. 2, the port numbers of the external network addresses are mapped to the same port numbers of the replacement network addresses. When assuming that all traffic with respect to the external network addresses illustrated in the replacement table 200 of FIG. 2 belongs to the same traffic class, it can be seen that differentiated handling on the basis of the replacement network addresses can be implemented in a very efficient manner by defining a packet classification rule which identifies data packets on the basis of the IP address range as used for the illustrated replacement network addresses, e.g., the IP address range from "10.1.1.23" to "10.1.1.25". Also, a packet classification rule could be defined which operates on the basis of a wildcard, e.g., identifies data packets in which the replacement network address matches the pattern "10.1.1.X", where X is a wildcard placeholder matching any possible value in the replacement network addresses of the data packets.

Figure 3:
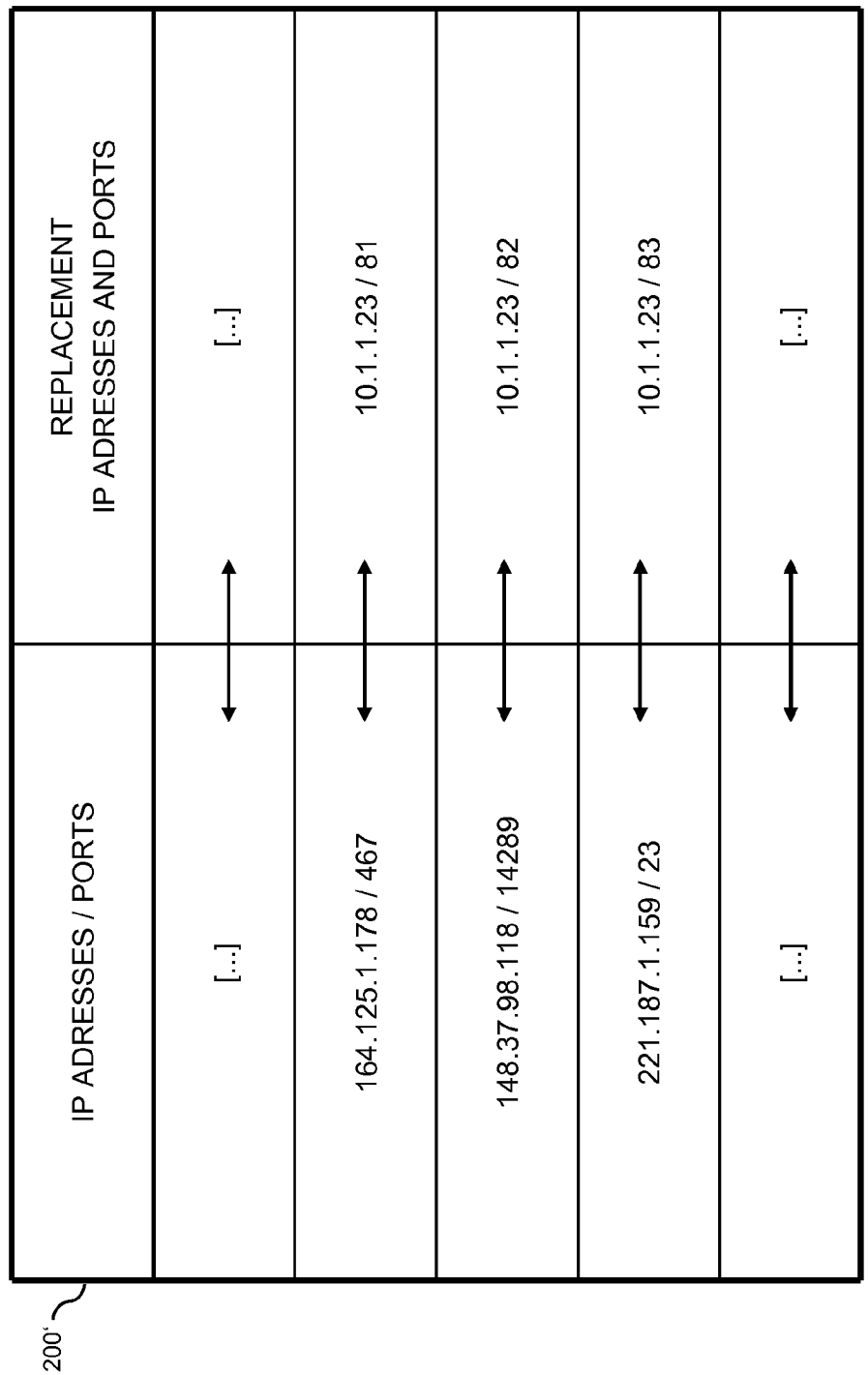
FIG. 3 schematically illustrates a further example of a table for mapping network addresses to replacement network addresses.

FIG. 3 schematically illustrates a further exemplary replacement table 200' used for defining a mapping between external network addresses and replacement network addresses. Again, both the external network addresses and the replacement network addresses include network addresses from the IPv4 address space an further include port numbers. The external network addresses are public addresses, whereas the replacement network addresses are from a private subnet of the total address space. A one-to-one mapping is defined between the external network addresses and the replacement network addresses. Accordingly, the network address translation on incoming data packets will always replace an external source address with the corresponding replacement network address, and the network address translation on the outgoing data packets can retranslate this replacement network address to the original external network address. In the example of FIG. 3, different external network addresses are mapped to the same IP address of the replacement network addresses, but to different port numbers. In this way, the IP address space which is available for the replacement network addresses can be used in a very efficient manner. When assuming that all traffic with respect to the external network addresses illustrated in the replacement table 200' of FIG. 2 belongs to the same traffic class, it can be seen that differentiated handling on the basis of the replacement network addresses can be implemented in a very efficient manner by defining a packet classification rule which identifies data packets on the basis of the single IP address as used for the illustrated replacement network addresses, i.e., the IP address "10.1.1.23", but disregards the port numbers of the replacement network addresses.

In the following, operation of the traffic adaptation device 100 according to embodiments of the invention will be explained in more detail.

According to an embodiment, when the traffic class detector 110 detects data packets of a certain traffic class, it may select an available replacement network address to be used by the network address translator 120 in the process of network address translation. For DL data packets, the network address translator 120 replaces the source network address with the replacement network address. For UL data packets, the replacement network address will already be in place of the destination network address, and the network address translator replaces the replacement network address with the corresponding external network address, which can then be used outside the network section to route the UL data packet to its destination. The selection of the replacement network address may be stored, thereby dynamically generating the replacement mapping data.

The traffic adaptation device 100 may then initiate generation of packet classification rules, e.g., one or more of the packet filters 62, 64, 72, 74, operating on the basis of the selected replacement network address. For example, the traffic adaptation device 100 could trigger the policy controller 30 to setup the corresponding bearer 52, 54, e.g., a dedicated bearer for premium traffic or a dedicated bearer for trash traffic. This could be accomplished using the signaling path 5, which may be implemented using the Rx interface according to the 3GPP TSs. In this way, the traffic adaptation device 100 could also provide the policy controller 30 with the replacement network address, e.g., private IP address and port number, which can then be used by the filter generator 35 of the policy controller 30 to generate the packet classification rules, e.g., one or more of the packet filters 62, 64, 72, 74. These may then be signaled to the gateway 26 using the signaling path 6, which may be implemented using the Gx interface according to the 3GP TSs. In some embodiments, if the replacement address itself or at least the range of replacement addresses corresponding to the traffic class is known a priori, the corresponding packet classification rules or packet filters, which operate on the basis of this known replacement network address or replacement network address range, could also be preconfigured into the policy controller 30, the gateway 26, and/or the UE 10.

In some embodiments, also the replacement mapping data could at least in part be preconfigured. For example, external network addresses which are known to be associated with a certain traffic class, e.g., cache servers or edge servers used by certain service or content providers, could be configured into the mapping data by a network operator. For data traffic with respect to such external network addresses, the traffic adaptation device 100 could then operate without requiring explicit detection of the traffic class and dynamic selection of the replacement network address on the basis of the detected traffic class. Rather, the preconfigured replacement mapping data would reflect the association of the external network address to the replacement network address and thereby to the corresponding traffic class.

In some embodiments, specific characteristics of certain types of network traffic are taken into account. For example, in some protocols such as TCP or UDP there is a connection handshake in the beginning of each TCP session. For example, when successfully establishing a TCP session, the TCP sender first sends a connection setup request (also referred to as aSYN packet), and the TCP receiver responds to that with a setup accept (also referred to as a SYN-ACK packet).

In order to provide good compatibility with such types of protocols, it is advantageous if the traffic class detector 110 is capable of detecting the traffic class already for the first DL data packet of a connection initiated from the network side. The network address translation performed by the network address translator 120 can then already be applied to the DL data packet including the connection setup request and will be further applied to all subsequent UL or DL data packets of this session. Changes of the source network address from the external network address to the replacement network address during the session, can therefore be avoided.

One way to allow the network address translation to be applied already to the first DL data packet of a network initiated session is to use preconfigured external network addresses in the replacement mapping data, or to preconfigure the traffic class detector 110 with the external network addresses associated with a certain traffic class.

A further way to allow the network address translation to be applied already to the first DL data packet of a network initiated session is to use self-learning of the external addresses and their associated traffic class. In this case, the traffic class detector 110 may learn from traffic inspection which external network addresses are associated with certain traffic classes, e.g., are to be considered as premium or trash traffic, and remembers these external network addresses. This acquired knowledge then be applied to subsequent sessions.

A still further way to allow the network address translation to be applied already to the first DL data packet of a network initiated session is to inspect setup messages transmitted in preparation of the session. In this case the traffic class detector 110 may learn from inspecting the setup messages, e.g. messages of a signaling protocol such as SIP, DNS messages, or the like, whether the subsequent associated user plane traffic, e.g., a TCP or UDP session, into which traffic class the data packets of this session should be classified. For example, a network label, e.g., a hostname or a domain name may be extracted from the setup message and compared to one or more stored network labels which are indicative of certain traffic classes.

Figure 4:
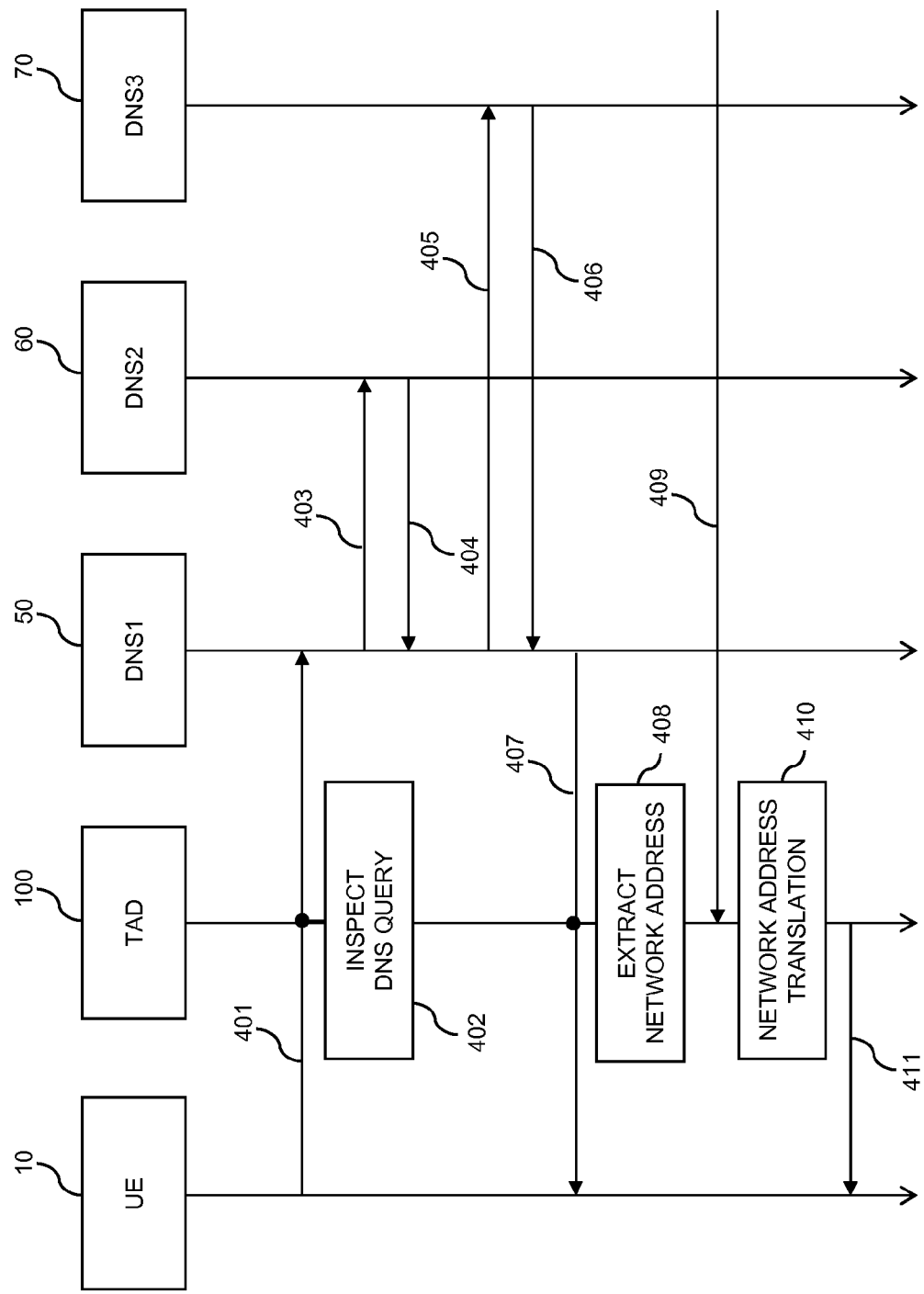
FIG. 4 shows a signaling diagram for illustrating an exemplary scenario in which differentiated handling of network traffic according to an embodiment of the invention can be applied.

An example of a signal flow in which a setup message in the form of a DNS query is used to detect the traffic class of a subsequent session is depicted in FIG. 4. The signaling flow involves the UE 10, the traffic adaptation device 100, a local DNS server 50, an external DNS server 60, and a domain DNS server 70.

In the signaling flow of FIG. 4, the UE 10 sends a DNS query 401 to the local DNS server 50. The DNS query 401 requests a network address for a network label, e.g., a hostname or a domain name, as specified in the DNS query 401. At step 402, the traffic class detector 110 of the traffic adaptation device 100 monitors the DNS query 401. For example, this monitoring may involve extracting the network label from the message 401 and comparing the extracted network label to one or more stored network labels, e.g., store hostnames or stored domain names, which are indicative of data traffic of a certain traffic class. If there is a match at step 402, the traffic class detector 110 may conclude that the traffic with respect to the requested network address belongs to the traffic class indicated by the stored network label.

When now assuming that the local DNS server 50 does not know the requested network address, it issues a further DNS query 403 to a first external DNS server 60, which may be a root DNS server. The external DNS server 60 may then return a message 404 including a network address of a still further external DNS server 70 which knows the requested external network address, e.g., a DNS server which is authoritative for the domain of the network label specified in the DNS query 401. The local DNS server 50 then issues a further DNS query 405 to the external DNS server 70, which then responds with a message 406 including the requested network address. The local DNS server then sends a message 407 with the requested network address to the UE 10 so as to respond to the original DNS query 401. At step 408, the traffic class detector 110 of the traffic adaptation device 100 monitors the message 407 and extracts the requested network address therefrom. The traffic adaptation device 100 may then select a replacement network according to the detected traffic class and add the selected replacement address with the extracted network address to the replacement mapping data so as to be used for performing network address translation on subsequently transmitted DL and UL data packets.

The subsequently transmitted first DL packet 409 of the session established with respect to the external network address will then, at step 410, be subjected to network address translation by the network address translator 120 of the traffic adaptation device 100. In this process, the network address translator 120 will replace the external network address indicating the source of the data packet 409, with the selected replacement network address. The adapted data packet 411 with the replaced source address is then forwarded to the UE 10.

For sessions initiated from the UE 10, similar considerations apply. In this case, the first UL data packet including the connection setup request would need to be generated by the UE 10 already using the correct replacement network address in place of the destination network address.

One way to have the correct replacement network address already in the first UL data packet of a session initiated from the UE 10 is to inspect setup messages transmitted in preparation of the session. In this case the traffic class detector 110 may learn from inspecting the setup messages, e.g., messages of a signaling protocol such as SIP, DNS messages, or the like, into which traffic class the data packets of the subsequent associated user plane traffic, e.g., a TCP or UDP session, should be classified. For example, a network label, e.g., a hostname or a domain name may be extracted from the setup message and compared to one or more stored network labels which are indicative of certain traffic classes.

Figure 5:
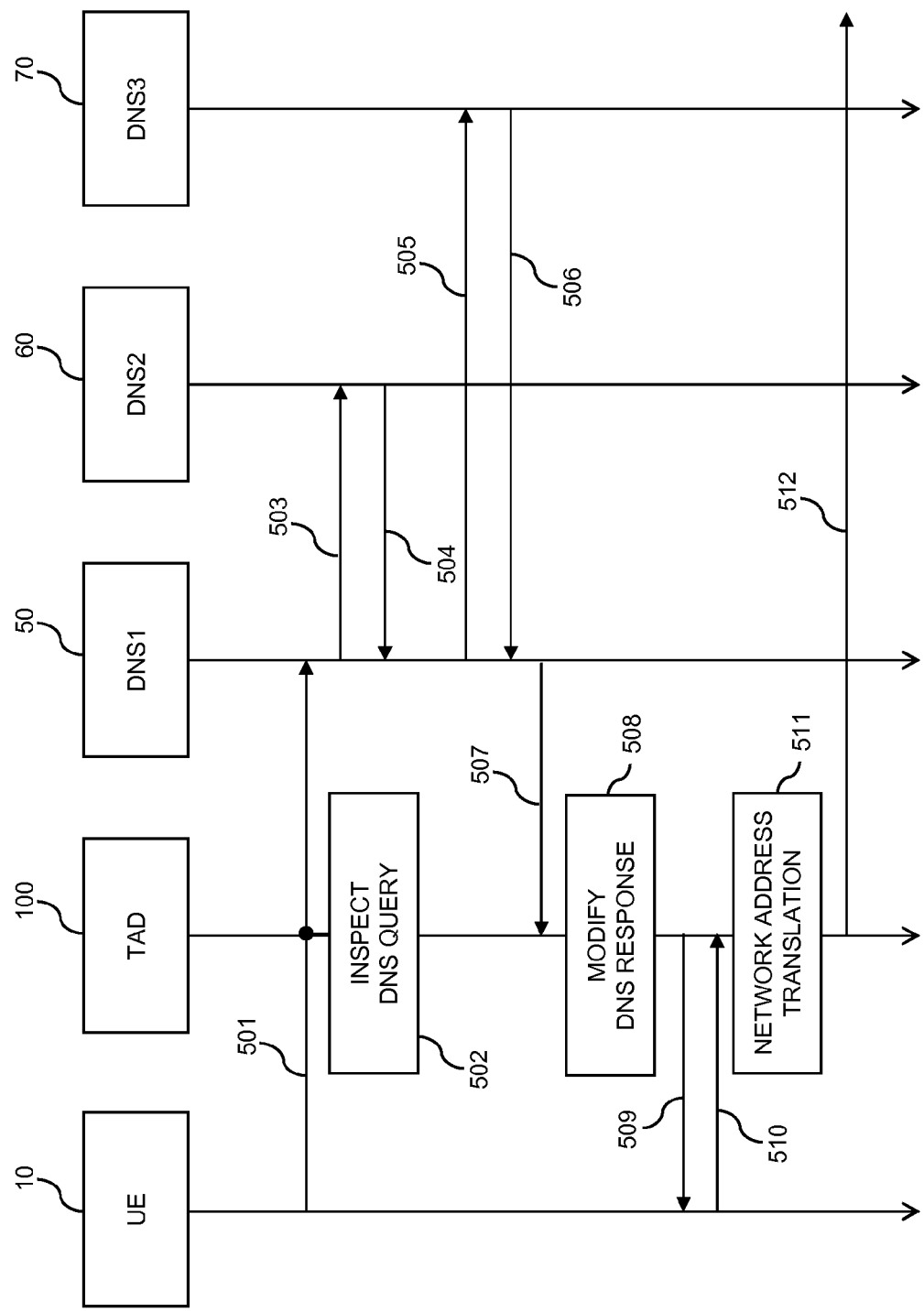
FIG. 5 shows a signaling diagram for illustrating a further exemplary scenario in which differentiated handling of network traffic according to an embodiment of the invention can be applied.

An example of a signal flow in which a setup message in the form of a DNS query is used to detect the traffic class of a subsequent session is depicted in FIG. 5. Similar to FIG. 4, the signaling flow involves the UE 10, the traffic adaptation device 100, a local DNS server 50, an external DNS server 60, and a domain DNS server 70.

In the signaling flow of FIG. 5, the UE 10 sends a DNS query 501 to the local DNS server 50. The DNS query 501 requests a network address for a network label, e.g., a hostname or a domain nanme, as specified in the DNS query 501. At step 502, the traffic class detector 110 of the traffic adaptation device 100 monitors the DNS query 501. For example, this monitoring may involve extracting the network label from the message 501 and comparing the extracted network label to one or more stored network labels, e.g., stored hostnames or stored domain names, which are indicative of data traffic of a certain traffic class. If there is a match at step 502, the traffic class detector 110 may conclude that the traffic with respect to the requested network address belongs to the traffic class indicated by the stored network label.

When now assuming that the local DNS server 50 does not know the requested network address, it issues a further DNS query 503 to a first external DNS server 60, which may be a root DNS server. The external DNS server 60 may then return a message 504 including a network address of a still further external DNS server 70 which knows the requested external network address, e.g., a DNS server which is authoritative for the domain of the network label specified in the DNS query 501. The local DNS server 50 then issues a further DNS query 505 to the external DNS server 70, which then responds with a message 506 including the requested network address. The local DNS server then sends a message 507 with the requested network address to the UE 10 so as to respond to the original DNS query 501. At step 508, the packet class detector 110 of the traffic adaptation device 100 receives the message 507 and extracts the requested network address therefrom. The traffic adaptation device 100 may then select a replacement network according to the detected traffic class and add the selected replacement address with the extracted network address to the replacement mapping data so as to be used for performing network address translation. In addition, the traffic adaptation device 100 also modifies the message 507 by replacing the network address returned in the message 507 with the selected replacement network address. The modified message 509 is then forwarded to the UE 10.

The subsequently transmitted first UL data packet 510 of the session established with the external network address will then carry the replacement network address in place of its destination address. At step 511, the first UL data packet 510 is subjected to network address translation by the network address translator 120 of the traffic adaptation device 100. In this process, the network address translator 120 will replace the replacement network address with the corresponding external network address. The data packet 512 with the replaced destination address is then forwarded to the network.

Figure 6:
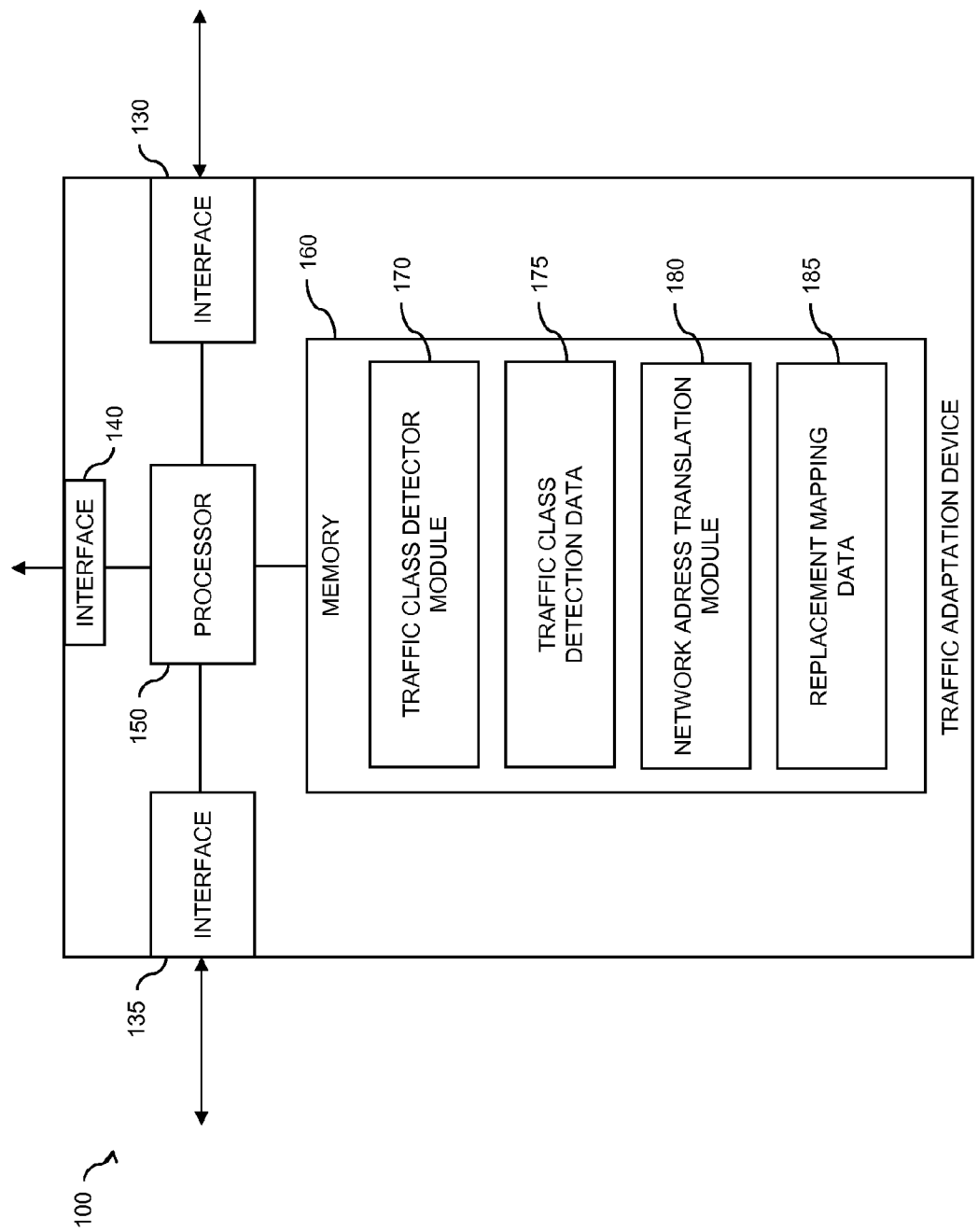
FIG. 6 schematically illustrates a network device according to an embodiment of the invention.

FIG. 6 further illustrates an exemplary implementation of the traffic adaptation device 100.

In the illustrated implementation, the traffic adaptation device 100 includes an external interface 130 configured to receive DL traffic to be transmitted to UE 10 and to forward UL traffic coming from the UE 10. Accordingly, the external interface 130 is a bidirectional interface. However, in some embodiments, if the traffic adaptation device is configured for adaptation of DL traffic only, the external interface 130 may be a unidirectional interface for receiving the DL traffic to be transmitted to the UE 10. Also, in some embodiments, if the traffic adaptation device 100 is configured for adaptation of UL traffic only, the external interface 130 may be a unidirectional interface for forwarding the UL traffic from the UE 10. Further, the traffic adaptation device 100 also includes an internal interface 135 with respect to the network section in which differentiated handling of network traffic is provided. The internal interface is configured to receive the UL traffic coming from the UE 10 and to forward the DL traffic to the UE 10. Accordingly, the internal interface 135 is a bidirectional interface. However, in some embodiments, if the traffic adaptation device is configured for adaptation of DL traffic only, the internal interface 135 may be a unidirectional interface for forwarding the DL traffic to the UE 10. Also, in some embodiments, if the traffic adaptation device 100 is configured for adaptation of UL traffic only, the internal interface 135 may be a unidirectional interface for receiving the UL traffic coming from the UE 10.

Moreover, the traffic adaptation device 100 may also be provided with a control interface 140, which can be used to provide indications to other entities, e.g., to initiate generation of packet filters by signaling to the policy controller 30 and/or to the gateway 26, and/or to initiate control processes with respect to forwarding procedures of data packets, e.g., modification and/or establishment of the bearers 52, 54. In the illustrated 3GPP scenario, the control interface 140 may be implemented as the Rx interface according to the 3GPP TSs. Further, the interface 140 may also be used to obtain replacement mapping data, traffic class detection data, and/or or other data from which the replacement mapping data or traffic class detection data may be derived.

Further, the traffic adaptation device 100 includes a processor 150 coupled to the interfaces 130, 135, 140 and a memory 160 coupled to the processor 150. The memory 160 may include a read-only memory (ROM), e.g. a flash ROM, a random-access memory (RAM), e.g. a Dynamic RAM (DRAM) or static RAM (SRAM), a mass storage, e.g. a hard disk or solid state disk, or the like. The memory 160 includes suitably configured program code to be executed by the processor 150 so as to implement the above-described functionalities of the traffic adaptation device 100. More specifically, the memory 160 may include a traffic class detection module 170 so as to implement the above-described mechanisms of traffic class detection used by the traffic class detector 110, traffic class detection data 175 to be used in the process of traffic class detection, a network address translation module 180 so as to implement the above functionalities of network address translation as performed by the network address translator 120, and replacement mapping data 185 to be used in the network address translation process, e.g., stored in the form of a table as illustrated in FIG. 2 or 3.

It is to be understood that the structure as illustrated in FIG. 6 is merely schematic and that the traffic adaptation device 100 may actually include further components which, for the sake of clarity, have not been illustrated, e.g. further interfaces. Also, it is to be understood that the memory 150 may include further types of program code modules, which have not been illustrated, e.g., program code modules for implementing functionalities obtaining or generating the traffic class detection data, e.g., a learning module. According to some embodiments, also a computer program product may be provided for implementing concepts according to embodiments of the invention, e.g., a computer-readable medium storing the program code to be stored in the memory 160.

FIG. 7 shows a flowchart for schematically illustrating a method 700 of processing network traffic according to an embodiment of the invention. The method may be used to implement processing of incoming data packets entering a network section, e.g., using the above-described traffic adaptation device 100.

At step 710, an incoming data packet is received, e.g., using the external interface 130 of the traffic adaptation device 100 as illustrated in FIG. 6. The incoming data packet is to be transmitted into a network section in which differentiated handling of network traffic is provided, e.g., with respect to QoS, charging, gating, or redirection. The data packet includes a source network address, which typically indicates a source of the data packet outside the network section.

At step 720, an optional step of detecting the traffic class of the data packet is performed, e.g., by the traffic class detector 110 of the traffic adaptation device 100 as illustrated in FIG. 1. For example, the traffic class may be detected on the basis of stored external network addresses by matching a source network address of the incoming data packet to one of the stored network addresses. Alternatively or in addition, the traffic class could also be detected by inspecting a message transmitted in preparation of transmitting the incoming data packet, e.g., a message of a signaling protocol such as SIP or a DNS message.

At step 730, network address translation is performed on the received data packet by replacing the source network address with a replacement network address. The replacement network address is selected according to a traffic class of the data packet, e.g., the traffic class as optionally detected at step 720. For example, the replacement network address may be selected from a private network address range.

At step 740, differentiated handling of the data packet is performed in the network section. This is accomplished on the basis of the replacement network address. For example, one or more packet classification rules, e.g., packet filters, operating on the basis of the replacement network address may be provided in the network section. In some embodiments, dynamic generation of the packet classification rules may be initiated in response to detecting the traffic class of the data packet.

FIG. 8 shows a flowchart for schematically illustrating a further method 800 of processing network traffic according to an embodiment of the invention. The method may be used to implement processing of outgoing data packets leaving a network section, e.g., using the above-described traffic adaptation device 100.

At step 810, differentiated handling of the outgoing data packet is performed in the network section. This is accomplished on the basis of a replacement network address included in the outgoing data packet in place of a destination network address of the data packet. The replacement network address is selected according to a traffic class of the data packet. For example, the replacement network address may be selected from a private network address range. The destination network address and the replacement network address may be related to each other by replacement mapping data, e.g., generated in response to detecting the traffic class of the data packet or of other data packets.

For example, one or more packet classification rules, e.g., packet filters, operating on the basis of the replacement network address may be provided in the network section. In some embodiments, dynamic generation of the packet classification rules may be initiated in response to detecting the traffic class of the data packet, e.g., by the traffic class detector 110. As explained above, this detection may be accomplished on the basis of a setup message preceding transmission of the outgoing data packet. Further, such a setup message may also be modified so as to ensure that the outgoing data packet uses the correct replacement network address in place of its destination network address even if the outgoing data packet is the first data packet of a session. The differentiated handling may be, e.g., with respect to QoS, charging, gating, or redirection.

At step 820, the outgoing data packet is received so as to be adapted for transmission from the network section. This may be accomplished using the internal interface 135 of the traffic adaptation device 100 as illustrated in FIG. 6.

At step 830, network address translation is performed on the received data packet by replacing the replacement network address with the destination network address of the data packet. The data packet with the replaced destination address may then be forwarded so as to be routed to its destination on the basis of the destination network address.

In some embodiments of the invention, the methods of FIGS. 7 an 8 may also be combined with each other by applying network address translation in the illustrated manner to both incoming and outgoing data packets. In this way, compatibility to protocols using bidirectional exchange of data packets can be provided. Also, it is to be understood that in some embodiments the above-described concepts could be applied to unidirectional traffic by adapting only the incoming data packets or only the outgoing data packets.

It is to be understood that the examples and embodiments as explained above are merely illustrative and susceptible to various modifications. For example, the concepts could be used in other types of communication network which benefit from differentiated handling of traffic classes, e.g., in IP based networks in general. In such other types of communication networks, other mechanisms than bearer assignments may be used for adapting the QoS level. For example, in an IP based network Differentiated Services Code Point Fields of the data packets could be set in order to adapt the QoS level. Also, the concepts may be applied to any number of different traffic classes. Also, differentiated handling may also be accomplished with respect to charging, gating, or redirection of data packets. Also, it is to be understood that in some embodiments the above-described concepts could be applied to unidirectional traffic by adapting only the incoming data packets or only the outgoing data packets. Further, it is to be understood that the above concepts may be implemented by using correspondingly designed software in existing network devices, or by using dedicated network device hardware.

The invention claimed is:

1. A method of processing network traffic, the method implemented by a network device, the method comprising:
   receiving, by the network device, an incoming data packet to be transmitted into a network section, the incoming data packet including a source network address and a destination address; and
   performing, by the network device, network address translation on the incoming data packet by replacing the source network address with a replacement source network address selected according to a traffic class of the incoming data packet,
   wherein said network address translation maintains the destination network address of the incoming data packet;
   wherein differentiated handling of the incoming data packet on the basis of the replacement source network address is to be provided in the network section, and wherein said differentiated handling comprises handling the incoming data packet according to a packet classification rule operating on the basis of the replacement source network address; and,
   wherein said packet classification rule is implemented as a packet filter for routing the incoming data packet to a bearer.

2. The method according to claim 1, wherein the packet classification rule is preconfigured.

3. The method according to claim 1, further comprising:
   selecting, by the network device, the replacement source network address to be used in said network address translation; and initiating, by the network device, generation of the packet classification rule operating on the basis the selected replacement source network address.

4. The method according to claim 1, further comprising:
   detecting, by the network device, the traffic class of the incoming data packet; and
   selecting, by the network device, the replacement source network address from a replacement source network address range which corresponds to the traffic class of the incoming data packet.

5. The method according to claim 3, further comprising:
   detecting, by the network device, the traffic class by comparing the source network address to at least one stored network address.

6. The method according to claim 4, further comprising:
   detecting, by the network device, the traffic class by inspecting a message transmitted in preparation of transmitting the incoming data packet.

7. A method of processing data traffic, the method implemented by a network device, the method comprising:
   receiving, by the network device, an outgoing data packet transmitted from a network section, the outgoing data packet including a replacement destination network address in place of a destination network address and a source network address, the replacement destination network address selected according to a traffic class of the outgoing data packet; and
   performing, by the network device, network address translation on the outgoing data packet by replacing the replacement destination network address with the destination network address,
   wherein said network address translation maintains the source network address of the outgoing data packet;
   wherein differentiated handling of the outgoing data packet on the basis of the replacement destination network address was provided in the network section, and wherein said differentiated handling comprises handling the outgoing data packet according to a packet classification rule operating on the basis of the replacement destination network address; and, wherein said packet classification rule is implemented as a packet filter for routing the outgoing data packet to a bearer.

8. The method according to claim 7, wherein the packet classification rule is preconfigured.

9. The method according to claim 7, further comprising:
selecting, by the network device, the replacement destination network address to be used in said network address translation; and
initiating, by the network device, generation of the packet classification rule operating on the basis the selected replacement destination network address.

10. A method of processing data traffic, the method implemented by a network device, the method comprising:
receiving, by the network device, an outgoing data packet transmitted from a network section, the outgoing data packet including a replacement destination network address in place of a destination network address and a source network address, the replacement destination network address selected according to a traffic class of the outgoing data packet;
performing, by the network device, network address translation on the outgoing data packet by replacing the replacement destination network address with the destination network address, wherein said network address translation maintains the source network address of the outgoing data packet;
receiving, by the network device, a message transmitted into the network section in preparation of transmitting the outgoing data packet, said message indicating the destination network address of the outgoing data packet; and
modifying, by the network device, the message by replacing the destination network address with the replacement destination network address.

11. The method according to claim 10, further comprising:
on the basis of the message, selecting by the network device the replacement destination network address to be used in said network address translation.

12. A network device, comprising:
an external interface configured to receive an incoming data packet to be transmitted into a network section, the incoming data packet including a source network address and a destination network address; and,
a network address translator configured to perform network address translation on the incoming data packet by replacing the source network address with a replacement source network address selected according to a traffic class of the incoming data packet, said network address translation maintaining the destination address of the incoming data packet;
wherein differentiated handling of the incoming data packet on the basis of the replacement source network address is to be provided in the network section, and wherein said differentiated handling comprises handling the incoming data packet according to a packet classification rule operating on the basis of the replacement source network address; and,
wherein said packet classification rule is implemented as a packet filter for routing the incoming data packet to a bearer.

13. A network device, comprising:
an internal interface configured to receive an outgoing data packet transmitted from a network section, the outgoing data packet including a replacement destination network address in place of a destination network address and a source address, the replacement destination network address selected according to a traffic class of the outgoing data packet; and
a network address translator configured to perform network address translation on the outgoing data packet by replacing the replacement destination network address with the destination network address, said network address translation maintaining the source network address of the outgoing data packet;
wherein differentiated handling of the outgoing data packet on the basis of the replacement destination network address was provided in the network section, and wherein said differentiated handling comprises handling the outgoing data packet according to a packet classification rule operating on the basis of the replacement destination network address; and,
wherein said packet classification rule is implemented as a packet filter for routing the outgoing data packet to a bearer.

14. A non-transitory computer-readable medium which has an executable computer program product stored thereon, the computer program product comprising program code to be executed by a processor of a network device, thereby causing the network device to operate as follows:
receiving an incoming data packet to be transmitted into a network section, the incoming data packet including a source network address and a destination address; and
performing network address translation on the incoming data packet by replacing the source network address with a replacement source network address selected according to a traffic class of the incoming data packet, wherein said network address translation maintains the destination network address of the incoming data packet;
wherein differentiated handling of the incoming data packet on the basis of the replacement source network address is to be provided in the network section, and wherein said differentiated handling comprises handling the incoming data packet according to a packet classification rule operating on the basis of the replacement source network address; and,
wherein said packet classification rule is implemented as a packet filter for routing the incoming data packet to a bearer.

15. A non-transitory computer-readable medium which has an executable computer program product stored thereon, the computer program product comprising program code to be executed by a processor of a network device, thereby causing the network device to operate as follows:
receiving an outgoing data packet transmitted from a network section, the outgoing data packet including a replacement destination network address in place of a destination network address and a source network address, the replacement destination network address being selected according to a traffic class of the outgoing data packet; and
performing network address translation on the outgoing data packet by replacing the replacement destination network address with the destination network address, wherein said network address translation maintains the source network address of the outgoing data packet;

wherein differentiated handling of the outgoing data packet on the basis of the replacement destination network address was provided in the network section, and wherein said differentiated handling comprises handling the outgoing data packet according to a packet classification rule operating on the basis of the replacement destination network address; and, wherein said packet classification rule is implemented as a packet filter for routing the outgoing data packet to a bearer.

16. The method according to claim 1, further comprising:
receiving, by the network device, an outgoing data packet transmitted from the network section, the outgoing data packet including a replacement destination network address in place of a destination network address and a source network address, the replacement destination network address selected according to a traffic class of the outgoing data packet; and
performing, by the network device, network address translation on the outgoing data packet by replacing the replacement destination network address with the destination network address, and,
wherein said network address translation maintains the source network address of the outgoing data packet.

17. The method according to claim 7, further comprising:
receiving, by the network device, an incoming data packet to be transmitted into the network section, the incoming data packet including a source network address and a destination address; and
performing network address translation on the incoming data packet by replacing the source network address with a replacement source network address selected according to a traffic class of the incoming data packet, and,
wherein said network address translation maintains the destination network address of the incoming data packet.

18. The network device according to claim 12, further comprising:
an internal interface configured to receive an outgoing data packet transmitted from the network section, the outgoing data packet including a replacement destination network address in place of a destination network address and a source address, the replacement destination network address selected according to a traffic class of the outgoing data packet; and
the network address translator configured to perform network address translation on the outgoing data packet by replacing the replacement destination network address with the destination network address, said network address translation maintaining the source network address of the outgoing data packet.

19. The network device according to claim 13, further comprising:
an external interface configured to receive an incoming data packet to be transmitted into a network section, the incoming data packet including a source network address and a destination network address; and,
the network address translator configured to perform network address translation on the incoming data packet by replacing the source network address with a replacement source network address selected according to a traffic class of the incoming data packet, said network address translation maintaining the destination address of the incoming data packet.

20. The non-transitory computer-readable medium according to claim 14, wherein the network device further operate as follows:
receiving an outgoing data packet transmitted from the network section, the outgoing data packet including a replacement destination network address in place of a destination network address and a source network address, the replacement destination network address selected according to a traffic class of the outgoing data packet; and
performing network address translation on the outgoing data packet by replacing the replacement destination network address with the destination network address, and,
wherein said network address translation maintains the source network address of the outgoing data packet.

21. The non-transitory computer-readable medium according to claim 15, wherein the network device further operate as follows:
receiving an incoming data packet to be transmitted into a network section, the incoming data packet including a source network address and a destination address; and
performing network address translation on the incoming data packet by replacing the source network address with a replacement source network address selected according to a traffic class of the incoming data packet, and,
wherein said network address translation maintains the destination network address of the incoming data packet.

* * * * *

UNITED STATES PATENT AND TRADEMARK OFFICE
CERTIFICATE OF CORRECTION

PATENT NO. : 9,160,707 B2  
APPLICATION NO. : 13/818033  
DATED : October 13, 2015  
INVENTOR(S) : Ludwig Page 1 of 1

It is certified that error appears in the above-identified patent and that said Letters Patent is hereby corrected as shown below:

On the Title Page, in Item (56), under "OTHER PUBLICATIONS", in Column 2, Line 1, delete "3GPP. 3GPP" and insert -- 3GPP. $3^{rd}$ --, therefor.

On Page 2, in Item (56), under "OTHER PUBLICATIONS", in Column 2, Line 1, delete "3GPP. 3GPP" and insert -- 3GPP. $3^{rd}$ --, therefor.

In The Specification

In Column 2, Lines 36-37, delete "received-data" and insert -- received data --, therefor.

In Column 8, Line 59, delete "space an" and insert -- space and --, therefor.

In Column 9, Line 29, delete "space an" and insert -- space and --, therefor.

In Column 10, Line 23, delete "3GP" and insert -- 3GPP --, therefor.

In Column 10, Line 51, delete "aSYN" and insert -- a SYN --, therefor.

In Column 12, Line 37, delete "nanme," and insert -- name, --, therefor.

In Column 14, Line 14, delete "memory 150" and insert -- memory 160 --, therefor.

In Column 15, Line 42, delete "7 an 8" and insert -- 7 and 8 --, therefor.

In The Claims

In Column 16, Line 35, in Claim 3, delete "basis the" and insert -- basis of the --, therefor.

In Column 17, Line 17, in Claim 9, delete "basis the" and insert -- basis of the --, therefor.

Signed and Sealed this  
Eighth Day of March, 2016

Michelle K. Lee  
*Director of the United States Patent and Trademark Office*